US011801946B2

(12) United States Patent
Rogers et al.

(10) Patent No.: US 11,801,946 B2
(45) Date of Patent: Oct. 31, 2023

(54) SYSTEM FOR SENSING MINIATURE GAPS BY INDUCTIVE COUPLING

(71) Applicant: The Boeing Company, Chicago, IL (US)

(72) Inventors: John E. Rogers, Owens Cross Roads, AL (US); Robert Alan Smith, Huntsville, AL (US)

(73) Assignee: The Boeing Company, Arlington, VA (US)

( * ) Notice: Subject to any disclaimer, the term of this patent is extended or adjusted under 35 U.S.C. 154(b) by 1224 days.

(21) Appl. No.: 16/394,278

(22) Filed: Apr. 25, 2019

(65) Prior Publication Data

US 2020/0339282 A1 Oct. 29, 2020

(51) Int. Cl.
*B64F 5/00* (2017.01)
*G05B 19/4093* (2006.01)
*G05B 19/4099* (2006.01)
*G01B 7/14* (2006.01)

(52) U.S. Cl.
CPC ............ *B64F 5/00* (2013.01); *G01B 7/14* (2013.01); *G05B 19/4099* (2013.01); *G05B 19/40931* (2013.01); *G05B 2219/35062* (2013.01)

(58) Field of Classification Search
CPC ..... B64F 5/00; B64F 5/10; G01B 7/14; G05B 19/40931; G05B 19/4099; G05B 2219/35062
See application file for complete search history.

(56) References Cited

U.S. PATENT DOCUMENTS

| 4,071,820 | A | * | 1/1978 | Mushinsky | ............... | G01B 7/14 |
| | | | | | | 324/684 |
| 4,841,224 | A | * | 6/1989 | Chalupnik | ............... | G01B 7/14 |
| | | | | | | 324/609 |
| 4,924,172 | A | * | 5/1990 | Holmgren | ................ | G01B 7/14 |
| | | | | | | 324/690 |
| 6,618,505 | B2 | | 9/2003 | Cork et al. | | |
| 7,730,789 | B2 | | 6/2010 | Odendahl | | |
| 7,756,321 | B2 | | 7/2010 | Marsh et al. | | |

(Continued)

OTHER PUBLICATIONS

Fonseca et al., "Flexible wireless passive pressure sensors for biomedical applications," Solid-State Sensors, Actuators, and Microsystems Workshop, Hilton Head Island, SC, Jun. 4-8, 2006.

(Continued)

*Primary Examiner* — Benjamin P Lee
(74) *Attorney, Agent, or Firm* — Ostrager Chong Flaherty & Broitman P.C.

(57) ABSTRACT

Systems and methods for measuring air gaps between opposing surfaces of two structural components. In one application, such measurements are used to fabricate a shim that fills the air gap between two structural members, such as parts of an aircraft. The resonant inductive coupling-based sensing system has the capability to remotely measure an air gap using an on-board transmit system. Furthermore, the system has the capability to switch between multiple inductor-capacitor sets such as to simultaneously measure air gaps across an area so that a better profile of the air gap can be determined. The resonant inductive coupling-based gap sensor is configured as signal generating and signal sensing electronics printed or mounted on respective flexible substrates to provide a flexible and portable measurement solution.

21 Claims, 12 Drawing Sheets

(56) References Cited

U.S. PATENT DOCUMENTS

| | | | |
|---|---|---|---|
| 7,787,979 | B2 | 8/2010 | Marsh et al. |
| 7,957,825 | B2 | 6/2011 | Marsh et al. |
| 8,756,792 | B2 | 6/2014 | Boyl-Davis et al. |
| 8,813,382 | B1 | 8/2014 | Buttrick |
| 9,068,809 | B1 | 6/2015 | Lagally et al. |
| 9,170,086 | B1 * | 10/2015 | Youngquist .......... G01D 5/2046 |
| 9,435,633 | B2 | 9/2016 | Lagally et al. |
| 9,429,935 | B2 | 10/2016 | Boyl-Davis et al. |
| 11,435,176 | B2 * | 9/2022 | Rogers .................. G01B 7/14 |
| 2003/0062891 | A1 * | 4/2003 | Slates .................. G01D 5/2053 324/207.26 |
| 2010/0001718 | A1 * | 1/2010 | Howard ................ G01B 7/003 324/207.15 |
| 2015/0323301 | A1 * | 11/2015 | Zhe ........................ F01D 11/14 324/207.15 |
| 2016/0341572 | A1 * | 11/2016 | Fusare ................ H03K 17/954 |
| 2018/0106588 | A1 * | 4/2018 | Safai ...................... G01B 7/14 |
| 2018/0106589 | A1 * | 4/2018 | Safai ...................... G01B 7/14 |
| 2020/0025549 | A1 * | 1/2020 | Johnson .................. G01B 7/14 |
| 2020/0309504 | A1 * | 10/2020 | Rogers .................. G01B 7/14 |

OTHER PUBLICATIONS

Rida, et al., "Conductive Inkjet-Printed Antennas on Flexible Low-Cost Paper-Based Substrates for RFID and WSN Applications," IEEE Antennas and Propagation Magazine, vol. 51, No. 3, Jun. 2009, pp. 13-22.

Rose et al., "Adhesive RFID Sensor Patch for Monitoring of Sweat Electrolytes," IEEE Transactions on Biomedical Engineering, vol. 62, No. 6, Jun. 2015, pp. 1457-1465.

Bito et al., "Ambient RF Energy Harvesting From a Two-Way Talk Radio for Flexible Wearable Wireless Sensor Devices Utilizing Inkjet Printing Technologies," IEEE Transactions on Microwave Theory and Techniques, vol. 63, No. 12, Dec. 2015, pp. 4533-4543.

Escobedo et al., "Flexible Passive near Field Communication Tag for Multigas Sensing," Analytical Chemistry, *9 (2017), pp. 1697-1703.

Xu et al., "Passive and wireless near field communication tag sensors for biochemical sensing with smartphone," Sensors and Actuators B: Chemical, 246 (2017), pp. 748-755.

Abad et al., "Flexible tag microlab development: Gas sensors integration in RFID flexible tags for food logistic," Sensors and Actuators B, 127 (2207), pp. 2-7.

* cited by examiner

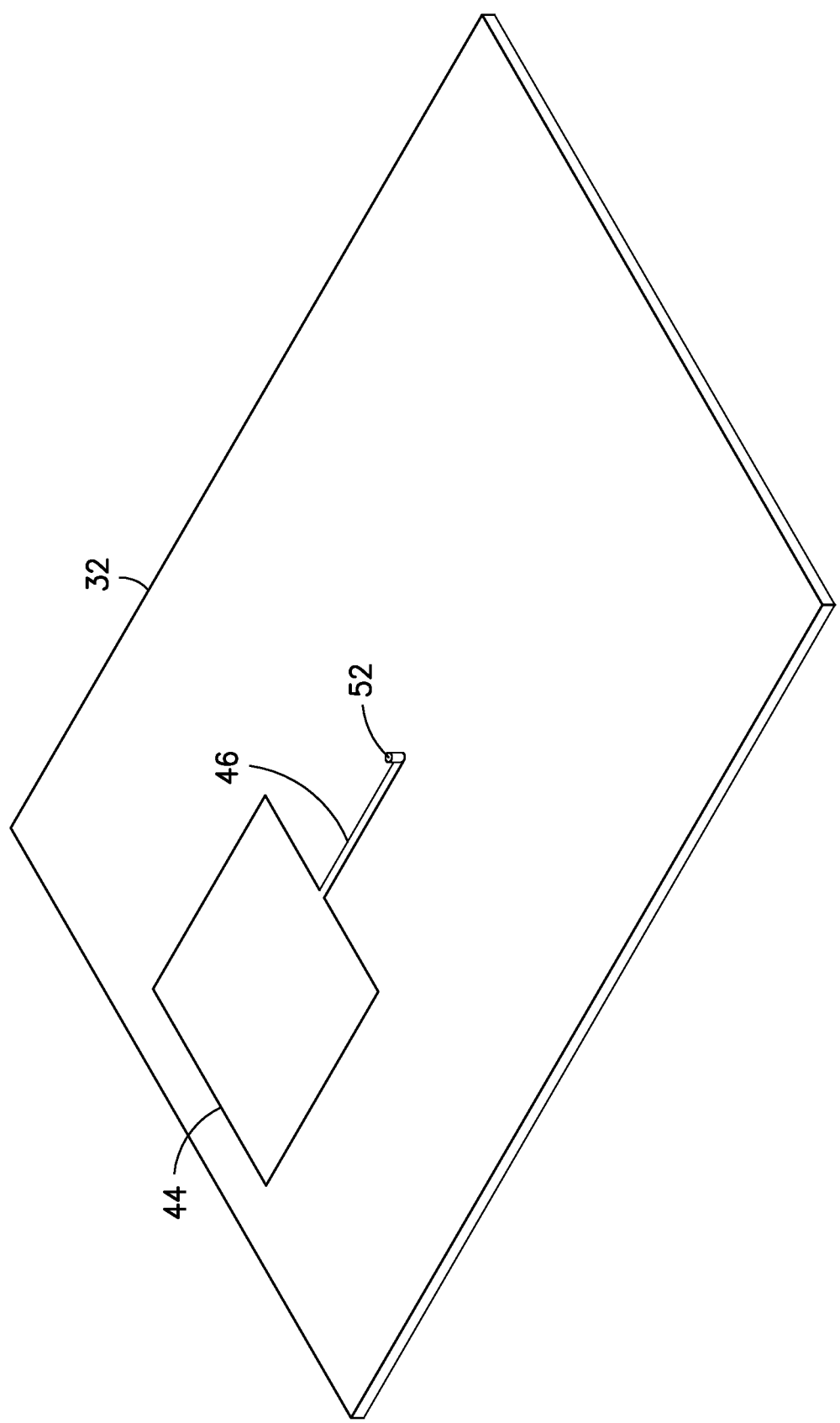

SYSTEM FOR SENSING MINIATURE GAPS BY INDUCTIVE COUPLING

BACKGROUND

This disclosure generally relates to measurement devices and, more specifically, to devices and methods for measuring a gap between two members of a mechanical structure to enable manufacture of a shim for insertion between the two structural members.

Shimming is a process in the aerospace industry for filling voids (e.g., air gaps) left behind as a result of aircraft assembly. Shimming is an intensive manufacturing process in terms of both time and cost. Many mechanical structures are manufactured by forming component parts of the structure followed by an assembly of the parts to produce the structure. During the assembly process, it may be necessary to introduce one or more shims between the interfacing surfaces of the component parts. A shim is a thin slip or wedge of metal, wood, etc., for placing into crevices, as between machine parts to compensate for wear or to achieve a certain alignment of the parts.

When the component parts are moved into their final positions, the gaps between the parts are typically measured using either feeler gauges or capacitive gap-measuring instrumentation. The measurement data is sent to a Computer Numerical Control (CNC) machine tool which manufactures the shims. The manufactured shims are then installed, and final "pull-up" tolerances are checked before the mating components are finally fastened together.

Existing measurement systems have either electrical (e.g., capacitive) or mechanical (e.g., spring) mechanisms for sensing gaps. Measurement systems based on mechanical springs can measure air gaps without regard to the type of material that bounds the gap; however, spring-based gap measurement devices are typically limited to measuring gaps larger than the compressed height of the spring (e.g., typically about 22 mils). Measurement systems based on electrical capacitance are capable of measuring air gaps down to about 7.5 mils; however, they are not agnostic to the conductive materials defining the gap. Furthermore, existing measurement systems are unable to take multiple measurements across an area simultaneously and relay them to a remotely located recorder.

There is a need for measurement systems capable of accurately determining miniaturized air gaps within hard-to-access spaces such that shims can be produced to improve first-time quality and reduce manufacturing cost.

SUMMARY

The subject matter disclosed in some detail below is directed to systems and methods for measuring air gaps between opposing surfaces of two structural components. In one application, such measurements are used to fabricate a shim that fills the air gap between two structural members, such as parts of an aircraft. In this disclosure, a resonant inductive coupling-based sensing system is configured to remotely measure an air gap using an on-board transmit system. Furthermore, the system has the capability to switch between multiple inductor-capacitor sets (also referred to herein as "LC circuits") such as to simultaneously measure air gaps across an area to produce a two-dimensional profile of the air gap. The resonant inductive coupling-based gap sensor is configured as signal generating and signal sensing electronics printed or mounted on respective flexible substrates (collectively referred to hereinafter as "flexible hybrid electronics" (FHE)) to provide a flexible and portable measurement solution.

In accordance with some embodiments, the resonant inductive coupling-based sensing system disclosed herein has an array of inductor-capacitor sets disposed on a first substrate of the flexible hybrid electronics and a second array of inductor-capacitor sets disposed on a second substrate of the flexible hybrid electronics for measuring the profile of an air gap (hereinafter "air gap profile") between two surfaces. In one application, the first substrate of the flexible hybrid electronics may be adhered to a first surface of a first structural component, while the second substrate of the flexible hybrid electronics is adhered to a second surface of a second structural component, the first and second surfaces being separated by an air gap. In another application, the first substrate of the flexible hybrid electronics may be adhered to a surface of a reference plane while the second substrate of the flexible hybrid electronics is adhered to a surface of a structural component that is separated from the reference plane by an air gap.

In accordance with some embodiments, the flexible hybrid electronics includes a first substrate with a first multiplicity of inductor-capacitor sets and a second substrate with a second multiplicity of inductor-capacitor sets, with the inductive coils of the inductor-capacitor sets of the first multiplicity being ideally aligned with corresponding inductive coils of the inductor-capacitor sets of the second multiplicity. Thus, each pair of inductor-capacitor sets having generally aligned inductive coils form a respective gap sensor, while a multiplicity of such pairs spatially distributed on a substrate form a two-dimensional array of gap sensors. A two-dimensional array of gap sensors may be moved from one position covering a first area to another position covering a second area which is contiguous with the first area. In this manner, the air gap profile in a region encompassing the first and second areas may be measured. In accordance with one embodiment, a transmit antenna formed on the second substrate is then used to relay the gap measurements to a remote sensing subsystem.

In accordance with some embodiments, the measurement sensor subsystem includes a signal generator and a first multiplicity of inductor-capacitor sets (first multiplicity of LC circuits) on a first flexible substrate and a second multiplicity of inductor-capacitor sets (second multiplicity of LC circuits) and a signal processor on a second flexible substrate. The system utilizes thin-film FHE substrates to improve the minimum detectable air gap or alternatively improve the dynamic range of the gap sensor. In accordance with one proposed implementation, the gap sensor is manufactured using a combination of subtractive (e.g., laser etch, milling, wet etching) and additive (e.g., printing, film deposition) methods.

The resonant inductive coupling-based sensing system further includes a computer system configured to measure the profile of the air gap between the confronting surfaces at a multiplicity of positions distributed over an area of each surface.

The gap sensor disclosed herein measures the size of the gap in the particular region where two aligned inductive coils of the gap sensor are positioned via resonant inductive coupling. Each inductor-capacitor set on the first substrate of the flexible hybrid electronics includes an inductor (e.g., in the form of a coil) and a capacitor. Likewise each inductor-capacitor set on the second substrate of the flexible hybrid electronics, each inductor-capacitor set includes an inductor (e.g., in the form of a coil) and a capacitor. Each inductor-capacitor set forms a respective LC circuit that can act as an electrical resonator, storing energy oscillating at the circuit's resonant frequency.

An inductive coil on the first substrate of the flexible hybrid electronics will be referred to herein as a "transmit coil"; an inductive coil on the second substrate of the flexible hybrid electronics will be referred to herein as a "receive coil". For the greatest amount of current to be induced in the receive coil by the transmit coil, the two coils are preferably oriented such that the receive coil is perpendicular to the magnetic flux generated by the transmit coil, that is, the axis of the receive coil is parallel to the magnetic flux.

Although various embodiments of systems and methods for measuring an air gap between two surfaces will be described in some detail below, one or more of those embodiments may be characterized by one or more of the following aspects.

One aspect of the subject matter disclosed in detail below is a system for measuring an air gap between first and second surfaces, comprising a first flexible substrate adhered to the first surface, a first LC circuit supported by the first flexible substrate and comprising a second inductor and a second capacitor, a signal generator electrically connected to the first LC circuit, a second flexible substrate adhered to the second surface, a second LC circuit supported by the second flexible substrate and comprising a second inductor and a second capacitor, a signal processor electrically connected to the second LC circuit, and a transmit antenna electrically connected to the signal processor, wherein the first inductor is aligned with the second inductor.

In accordance with some embodiments of the system described in the immediately preceding paragraph, the system further comprises a half-wave rectifier that converts alternating current from the LC circuit into direct current that is received by the signal processor. The signal processor is configured to convert analog signals into digital signals or read digital signals directly from the half-wave rectifier. The signal processor and half-wave rectifier are surface mounted on the second flexible substrate. The transmit antenna is disposed on the second flexible substrate. In addition, some embodiments further comprise a receive antenna, a digital signal processor configured to output digital gap size data which is a function of the received digital gap sensor measurement data, a non-transitory tangible computer-readable storage medium for storing gap size data representing the air gap profile output by the digital signal processor, and a display device for displaying symbology representing the air gap profile in response to retrieval of the gap size data from the non-transitory tangible computer-readable storage medium.

In accordance with one proposed implementation, the first flexible substrate comprises first and second dielectric layers adhered to each other, the first inductor is disposed on the first dielectric layer, the first capacitor comprises one electrode disposed on the first dielectric layer and electrically connected to the first inductor and another electrode disposed between the first and second dielectric layers. In addition, the second flexible substrate comprises third and fourth dielectric layers adhered to each other, the second inductor is disposed on the third dielectric layer, the second capacitor comprises one electrode disposed on the third dielectric layer and electrically connected to the second inductor and another electrode disposed between the third and fourth dielectric layers and electrically connected to the second inductor.

Another aspect of the subject matter disclosed in detail below is a method for measuring an air gap between a first surface of a first part and a second surface of a second part, comprising: adhering first flexible hybrid electronics comprising a first LC circuit formed on a first flexible substrate to the first surface of the first part; adhering second flexible hybrid electronics comprising a second LC circuit formed on a second flexible substrate to the second surface of the second part; driving a first inductor of the first LC circuit with a first alternating current to produce a changing magnetic flux that passes through a second inductor of the second LC circuit, which first alternating current has a frequency equal to a resonant frequency of the second LC circuit; inducing a second alternating current in the second inductor due to the magnetic flux passing through the second inductor; rectifying the second alternating current into a direct current; converting the direct current into digital gap sensor measurement data that varies in dependence on a distance separating the first and second inductors; transmitting the digital gap sensor measurement data to a digital signal processor; and computing an air gap size based on the digital gap sensor measurement data, wherein the computing is performed by the digital signal processor.

In accordance with some embodiments of the method described in the immediately preceding paragraph, the first and second parts are structural components of an aircraft, and the method further comprises: fabricating a shim having a thickness which varies in accordance with an air gap profile that includes the air gap size; and placing the shim in the air gap between the between the first and second parts.

In one proposed implementation, converting the direct current into digital gap sensor measurement data is performed by a signal processor and transmitting the digital gap sensor measurement data is performed by a transmit antenna, the method further comprising wirelessly transferring electric power to the signal processor via the transmit antenna.

A further aspect of the subject matter disclosed in detail below is a method for determining an air gap profile between a first surface of a first part and a second surface of a second part, the method comprising: adhering first flexible hybrid electronics comprising a first multiplicity of inductors formed on a first flexible substrate to the first surface of the first part; adhering second flexible hybrid electronics comprising a second multiplicity of inductors formed on a second flexible substrate to the second surface of the second part, the inductors of the second multiplicity of inductors being respectively aligned with the inductors of the first multiplicity of inductors; driving the inductors of the first multiplicity of inductors in sequence with respective first alternating currents to produce a changing magnetic flux that passes through respective aligned inductors of the second multiplicity of inductors; inducing respective second alternating currents in the respective aligned inductors of the second multiplicity of inductors due to the magnetic flux passing through the respective aligned inductors of the second multiplicity of inductors; rectifying the respective second alternating currents into respective direct currents; converting the respective direct currents into digital gap sensor measurement data that varies in dependence on the respective distances separating respective aligned inductors of the first and second multiplicities of inductors; transmitting the digital gap sensor measurement data to a digital signal processor; and computing an air gap profile based on the digital gap sensor measurement data, wherein the computing is performed by the digital signal processor. In accordance with some embodiments, the method further comprises: fabricating a shim having a thickness which varies in accordance with the air gap profile; and placing the shim in the air gap between the first and second parts.

Yet another aspect of the subject matter disclosed in detail below is a method for fabricating a gap sensor, comprising: forming a first inductor and a first electrode of a first capacitor on a first dielectric layer, wherein the first inductor is electrically connected to the first electrode of the first capacitor; forming a second electrode of the first capacitor on a second dielectric layer; bonding the first dielectric layer to the second dielectric layer to form a first flexible substrate with the first capacitor; forming a second inductor and a first electrode of a second capacitor on a third dielectric layer, wherein the second inductor is electrically connected to the first electrode of the second capacitor; forming a second electrode of the second capacitor on a fourth dielectric layer; bonding the third dielectric layer to the fourth dielectric layer to form a second flexible substrate with the second capacitor; forming a via in the second flexible substrate; and forming a conductor that fills the via and electrically connects the second inductor to the second electrode of the second capacitor. Following fabrication of the gap sensor, the first inductor and first capacitor are electrically connected to a signal generator. Then the first flexible substrate is adhered to a first surface of a first part and the second flexible substrate is adhered to a second surface of a second part separated from the first surface of the first part by an air gap so that the first and second inductors are mutually aligned.

Other aspects of systems and methods for measuring an air gap between two surfaces are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 6A and 6B are diagrams showing respective three-dimensional views of an inductor-capacitor set patterned on respective flexible layers of dielectric material (hereinafter "dielectric layers 30 and 32") for fabricating the flexible hybrid electronics in accordance with one embodiment.

Reference will hereinafter be made to the drawings in which similar elements in different drawings bear the same reference numerals.

DETAILED DESCRIPTION

Illustrative embodiments of systems and methods for measuring an air gap between two surfaces are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Resonant inductive coupling is the near-field wireless transmission of electrical energy between two coils that are tuned to resonate at the same frequency. Resonant transfer works by making a primary coil (referred to above and below as the "transmit coil") ring with an oscillating current, which generates an oscillating magnetic field. A secondary coil (referred to above and below as the "receive coil") in proximity to the primary coil can pick up energy from the oscillating magnetic field. If the primary and secondary coils are resonant at a common frequency, significant power can be transmitted at reasonable efficiency from the primary coil to the secondary coil over a range of, about one quarter wavelength, where wavelength is the speed of light divided by the frequency of the oscillating current. Resonant inductive coupling requires both a resonant frequency match and an orientation match between the transmitter and receiver (i.e., the transmitting and receiving LC circuits) for significant power transmission to occur. Specifically, the transmit coil and the receive coil are preferably oriented so that the magnetic dipole field passing through the receive coil from the transmit coil is oriented within about 45 degrees of parallel to the receive coil.

Figure 1:
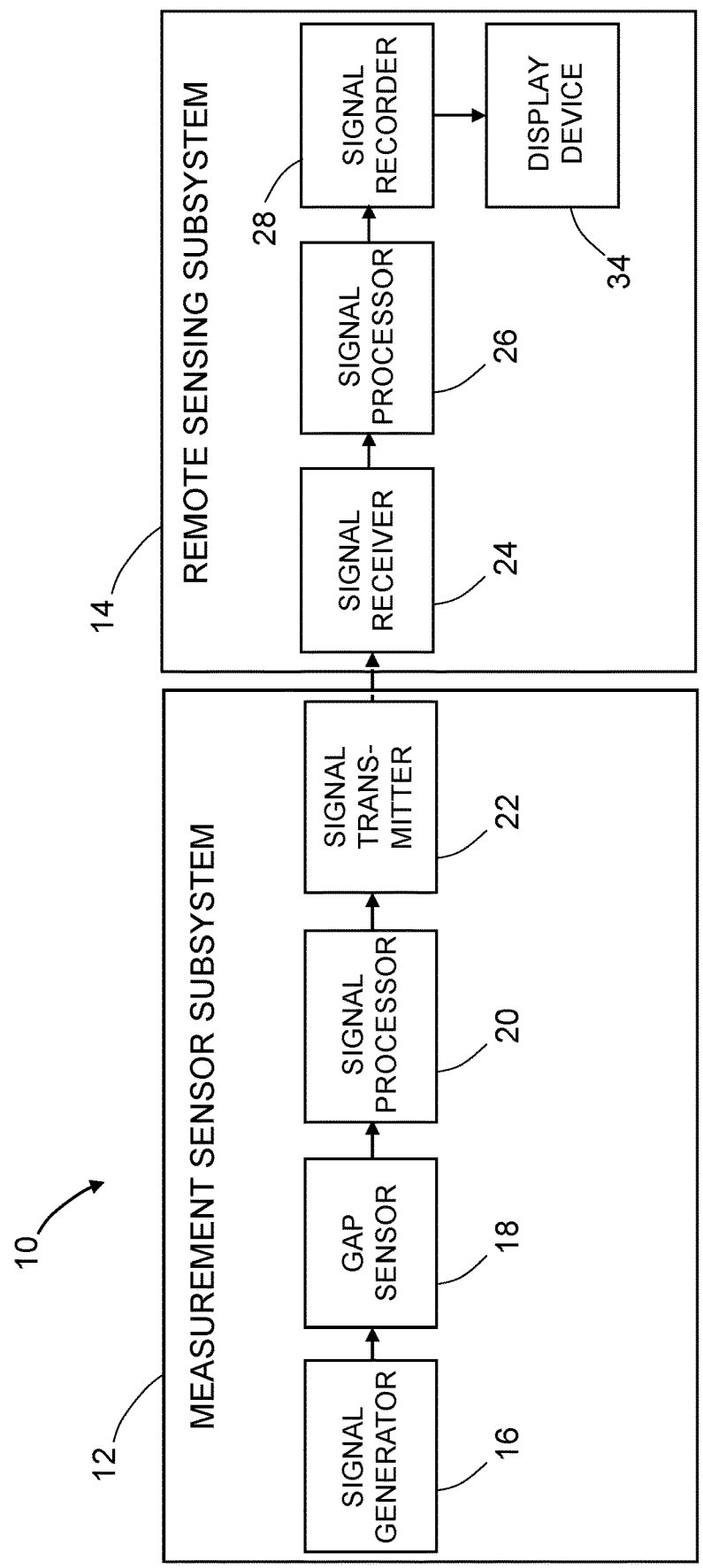
FIG. 1 is a block diagram identifying some components of a system for measuring an air gap between opposing surfaces of two structural members in accordance with one embodiment.

FIG. 1 is a block diagram identifying some components of a system 10 for measuring an air gap between opposing surfaces of two structural members in accordance with one embodiment. The system 10 includes a measurement sensor subsystem 12 and a remote sensing subsystem 14.

The measurement sensor subsystem 12 includes a signal generator 16, a gap sensor 18, a signal processor 20 and a signal transmitter 22. The gap sensor 18 includes first and second multiplicities of inductor-capacitor sets formed on first and second flexible substrates respectively. In accordance with some embodiments, the first multiplicity of inductor-capacitor sets of gap sensor 18 are electrically connected to the signal generator 16 surface mounted on the first flexible substrate, while the second multiplicity of inductor-capacitor sets of gap sensor 18 are electrically connected to the signal processor 20 (typically by way of a rectifier) surface mounted on the second flexible substrate. The signal processor 20 is also configured to perform any conditioning of the input signals and then output digital signals to the signal transmitter 22. The signal transmitter 22 is configured to wirelessly transmit radio frequency signals (modulated to carry the digital gap sensor measurement data) to the signal receiver 24 of the remote sensing subsystem 14. In one proposed implementation (depicted in FIG. 2), the signal transmitter 22 is a transmit antenna. In accordance with one embodiment, the electric power needed to activate the signal processor 20 is provided by the signal transmitter 22 (from the remote sensing subsystem 14). In accordance with an alternative embodiment, electric power it is provided by an on-board power source (not shown in FIG. 1).

Referring again to FIG. 1, the remote sensing subsystem 14 includes a signal receiver 24, a digital signal processor 26, a signal recorder 28 (e.g., a non-transitory tangible computer-readable storage medium) and a display device 34. In one proposed implementation, the signal receiver 24 includes a receive antenna. The digital signal processor 26 is configured to output digital gap size data representing an air gap profile which is a function of the gap sensor measurement data received by the signal receiver 24. The digital gap size data representing an air gap profile is stored in the signal recorder 28, which may take the form of any one of a number of non-transitory tangible computer-readable storage media. The display device 34 displays symbology representing the air gap profile in response to retrieval of the gap size data from the signal recorder 28. For example, the air gap profile may be displayed as a two-dimensional mapping of gap sizes (e.g., heights) on the display device 34 in a well-known manner. For example, a multiplicity of upwardly pointing arrows may be positioned on a two-dimensional positional grid, the length of each arrow being proportional to the size of the gap at that coordinate position of the particular gap sensor. In addition, the respective gap sizes may be displayed in the form of alphanumeric symbols.

The gap size data representing the air gap profile is compiled and sent to a machine tool which manufactures the shim. It should be noted that some data processing occurs before the gap size data is converted into a useful format for the machine tool. The algorithms used in this data processing are generally well known and widely available commercially. The manufactured shim is then installed, and final "pull-up" tolerances are checked before the mating components are finally fastened together.

Figure 2:
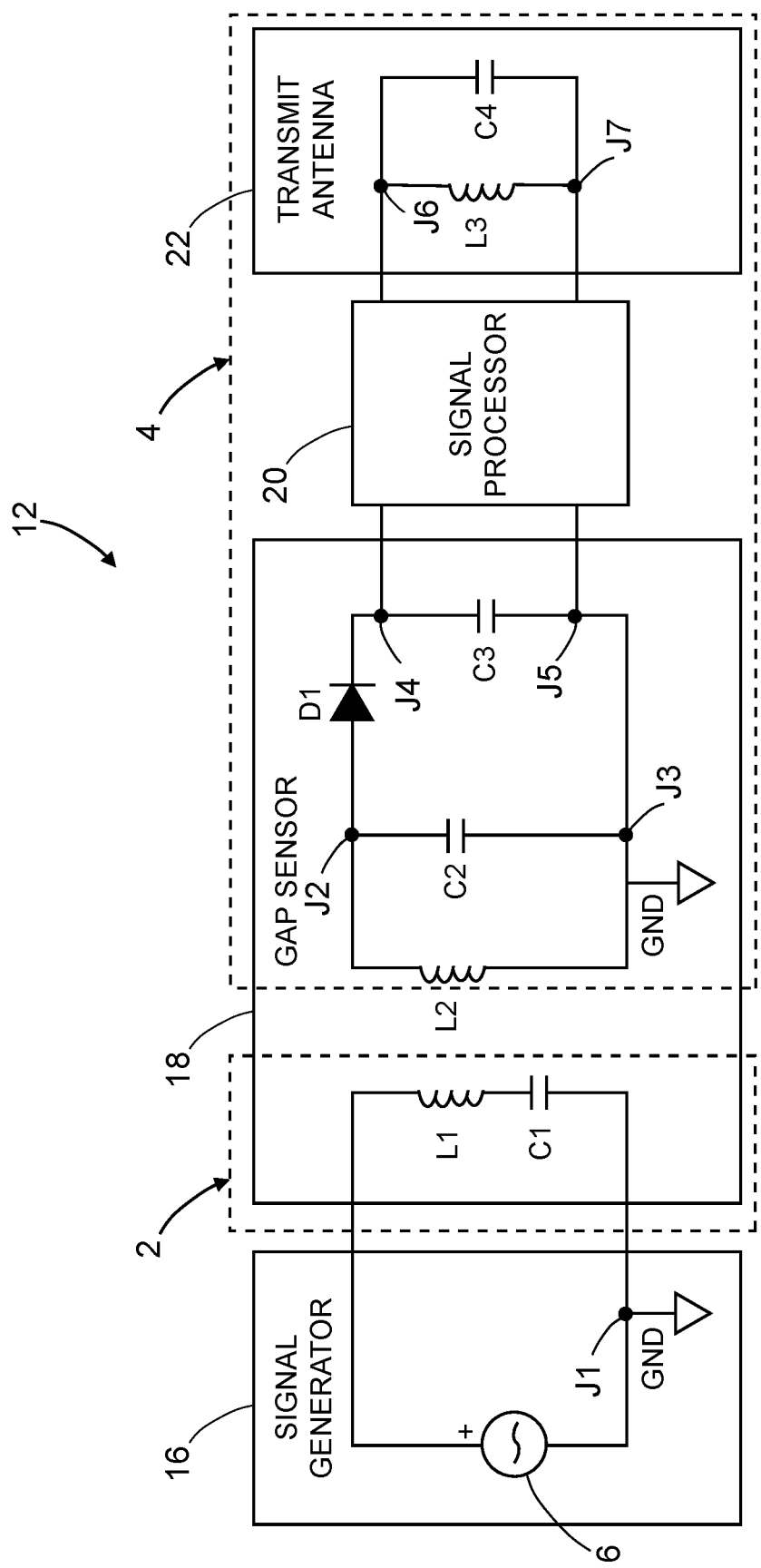
FIG. 2 is a circuit diagram identifying some components of a measurement sensor subsystem in accordance with one embodiment.

FIG. 2 is a circuit diagram identifying some components of a measurement sensor subsystem 12 in accordance with one embodiment. The signal generator 16 includes an alternating-current source 6 (hereinafter "AC source 6") that outputs an alternating current having a voltage. One terminal of the AC source 6 is electrically connected to a junction J1, which in turn is electrically connected to ground (GND in FIG. 2). (As used herein, the term "electrically connected" means connected via electrical conductor.)

The first portion of the gap sensor 18 includes an inductor L1 and a capacitor C1 which are connected in series. In one proposed implementation, the inductor L1 is an inductive coil having one terminal which is electrically connected to the other terminal of the AC source 6 and another terminal which is electrically connected to one electrode of the capacitor C1. The other electrode of the capacitor C1 is electrically connected to the junction J1. When the AC source 6 is activated, the inductor L1 produces a magnetic field which is tuned by the capacitor C1 to oscillate at a resonant frequency. More specifically, the AC source supplies a first alternating current to the inductor L1 that causes the inductor L1 to produce a changing magnetic flux.

The second portion of the gap sensor 18 includes an inductor L2 and a capacitor C2 which are connected in parallel across junctions J2 and J3 to form an LC circuit. In one proposed implementation, the inductor L2 is an inductive coil having one terminal which is electrically connected to a junction J2 and another terminal which is electrically connected to ground. In addition, one electrode of the capacitor C2 is electrically connected to the junction J2 and the other electrode of the capacitor C2 is electrically connected to a junction J3, which in turn is electrically connected to ground. The capacitance C2 is selected so that the LC circuit has the aforementioned resonant frequency. When the inductors L1 and L2 are aligned and separated by a sufficiently small distance, the magnetic flux produced by inductor L1 passes through the inductor L2, thereby inducing a second alternating current having the resonant frequency in the inductor L2. The amount electric power transferred to the inductor L2 is a measure of the distance separating the inductors L1 and L2.

The second portion of the gap sensor 18 further includes a half-wave rectifier D1 (e.g., a diode) having one terminal which is electrically connected to the junction J2 and another terminal which is electrically connected to a junction J4. The junction J4 in turn is electrically connected to one analog input port of the signal processor 20. In half-wave rectification of a single-phase supply, either the positive or negative half of the AC wave is passed, while the other half is blocked. The positive or negative half of the AC wave then charges up a capacitor such that a time-invariant DC signal is produced. The half-wave rectifier D1 converts the periodic sine (or square) wave detected into a time-invariant DC signal which is provided to an analog-to-digital converter incorporated in the signal processor 20.

The second portion of the gap sensor 18 further includes a capacitor C3. One electrode of the capacitor C3 is electrically connected to the junction J4 and the other electrode of the capacitor C2 is electrically connected to a junction J5, which in turn is electrically connected to ground via the junction J3. The other analog input port of the signal processor 20 is electrically connected to ground via the junctions J5 and J3. Thus the signal processor 20 is configured to measure the DC voltage across the capacitor C3, which voltage is a function of the size of the gap being measured.

The signal processor 20 is further configured to output digital gap sensor data representing the magnitude of the voltage to the signal transmitter 22. In the proposed implementation depicted in FIG. 2, the signal transmitter 22 includes a transmit antenna that includes an inductor L3 and a capacitor C4 connected in parallel across junctions J6 and J7. An inductor coil near-field antenna such as a radio-frequency identification (RFID) antenna (e.g., 13.56 MHz RFID antenna) may be used as the transmit antenna. The transmit antenna may be used for powering the signal processor 20 as well as relaying the gap sensor measurement data from the gap sensor 18. The signal transmitter 22 transmits the digital gap sensor data to the remote sensing subsystem 14 for further processing and measurement recording.

In accordance with one embodiments, the first portion of the gap sensor 18 is disposed on a first flexible substrate (indicated by the smaller dashed rectangle in FIG. 2) to form first flexible hybrid electronics 2, whereas the second portion of the gap sensor 18 is disposed on a second flexible substrate (indicated by the larger dashed rectangle in FIG. 2) to form second flexible hybrid electronics 4. Optionally, the signal generator 16 may be included in first flexible hybrid electronics 2. The inductor L1 and capacitor C1 of the first portion of the gap sensor 18 are patterned on the first flexible substrate. The inductor L2 and capacitors C2 and C3 of the second portion of the gap sensor 18 are patterned on the second flexible substrate. Optionally, the transmit antenna of the signal transmitter 22 (including inductor L3 and capacitor C4) is patterned on the second flexible substrate, whereas the half-wave rectifier D1 and the signal processor 20 are surface mounted on the second flexible substrate.

Figure 3:
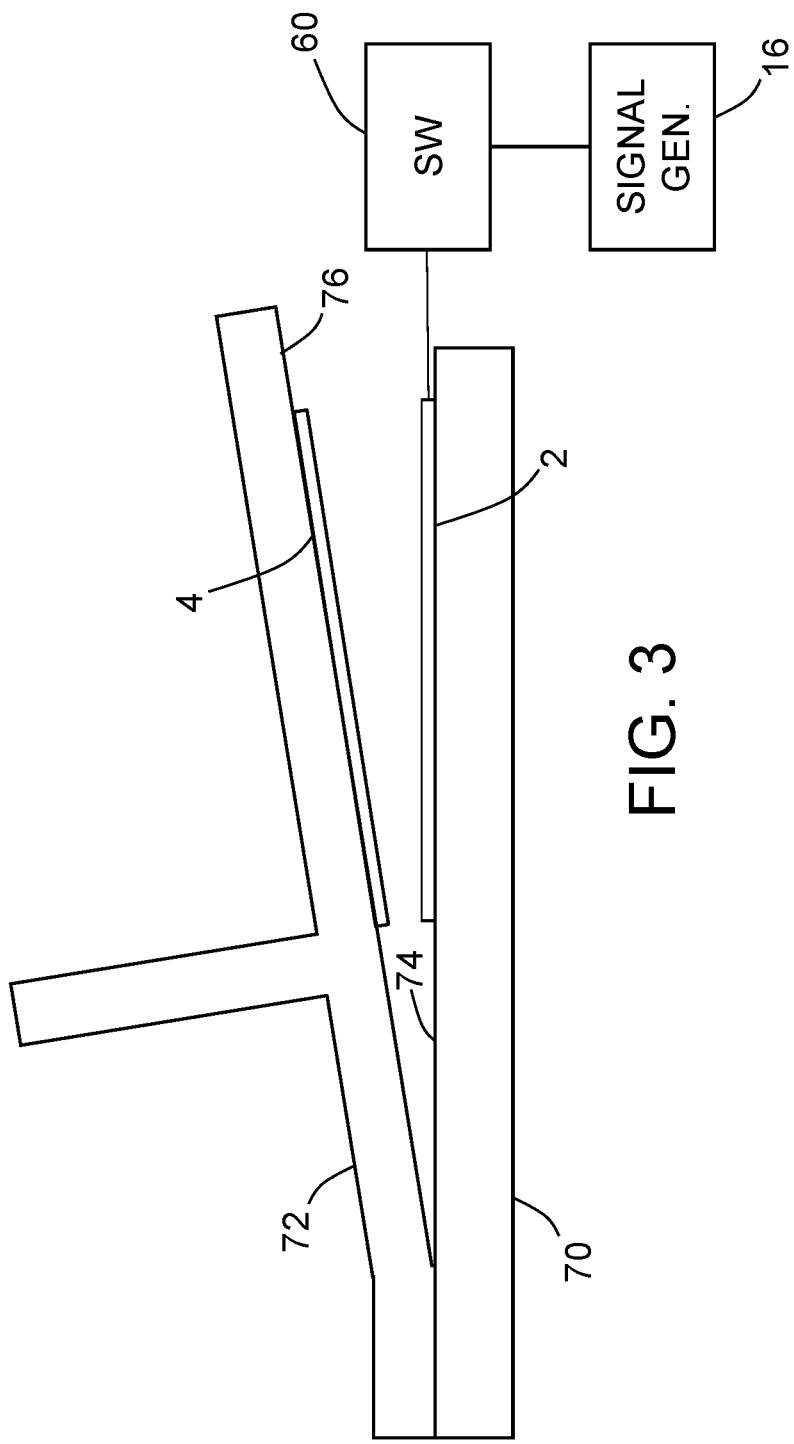
FIG. 3 is a diagram representing a side view of a measurement sensor subsystem having a first flexible substrate of first flexible hybrid electronics adhered to a surface of one structural member and a second flexible substrate of second flexible hybrid electronics adhered to an opposing surface of another structural member.

FIG. 3 is a diagram representing a side view of a measurement sensor subsystem having first flexible hybrid electronics 2 adhered to a surface 74 of one structural member 70 and second flexible hybrid electronics 4 adhered to an opposing surface 76 of another structural member 72. The flexible substrates allow the first and second flexible hybrid electronics 2 and 4 to respectively conform to surfaces that are contoured and not planar.

In accordance with one embodiment, a first multiplicity of LC circuits (each consisting of a respective inductor L2 and a respective capacitor C2 connected in parallel) are formed on the flexible substrate of the second flexible hybrid electronics 4. In accordance with one proposed implementation, the first multiplicity of LC circuits are arranged in an X-Y matrix. By placing the first multiplicity of LC circuits in an X-Y matrix, the gap sensor 18 will be able to measure the gap sizes at a multiplicity of points spaced across one of the surfaces 74 and 76.

In addition, a second multiplicity of LC circuits (each consisting of a respective inductor L1 and a respective capacitor C1 connected in series, as shown in FIG. 2, or in parallel) are formed on the flexible substrate of the first flexible hybrid electronics 2. The second multiplicity of inductors L1 are also arranged in the same matrix format as described in the immediately preceding paragraph. Ideally the inductors L2 on the second flexible hybrid electronics 4 should be aligned with the inductors L1 on the first flexible hybrid electronics 2 to ensure maximum power transfer. For example, respective sets of alignment markers or dowels may be placed within the respective flexible hybrid electronics such that they can be manually aligned before the gap is measured.

During a gap measurement procedure, a controller (not shown) is used to control a multiplicity of switches 60 (see FIG. 3) to select each individual inductor L1 sequentially. In accordance with one embodiment, the switches 60 are in the form of multiplexers. A first multiplexer is provided and used for controlling selection of a row of inductors L1 along an X-axis. A second multiplexer is also provided and used for controlling selection of inductors L1 along a Y-axis, i.e., selection of a particular inductor L1 within a selected row of inductors. By using multiplexers, each individual inductor L1 may be selected sequentially to electrically connect the selected inductor L1 to the signal generator 16. The gap at each inductor position is determined by measuring the power transferred to the corresponding inductor L2 in the second portion of the gap sensor 18 when the selected inductor L1 is energized with alternating current at the resonant frequency.

Figure 4:
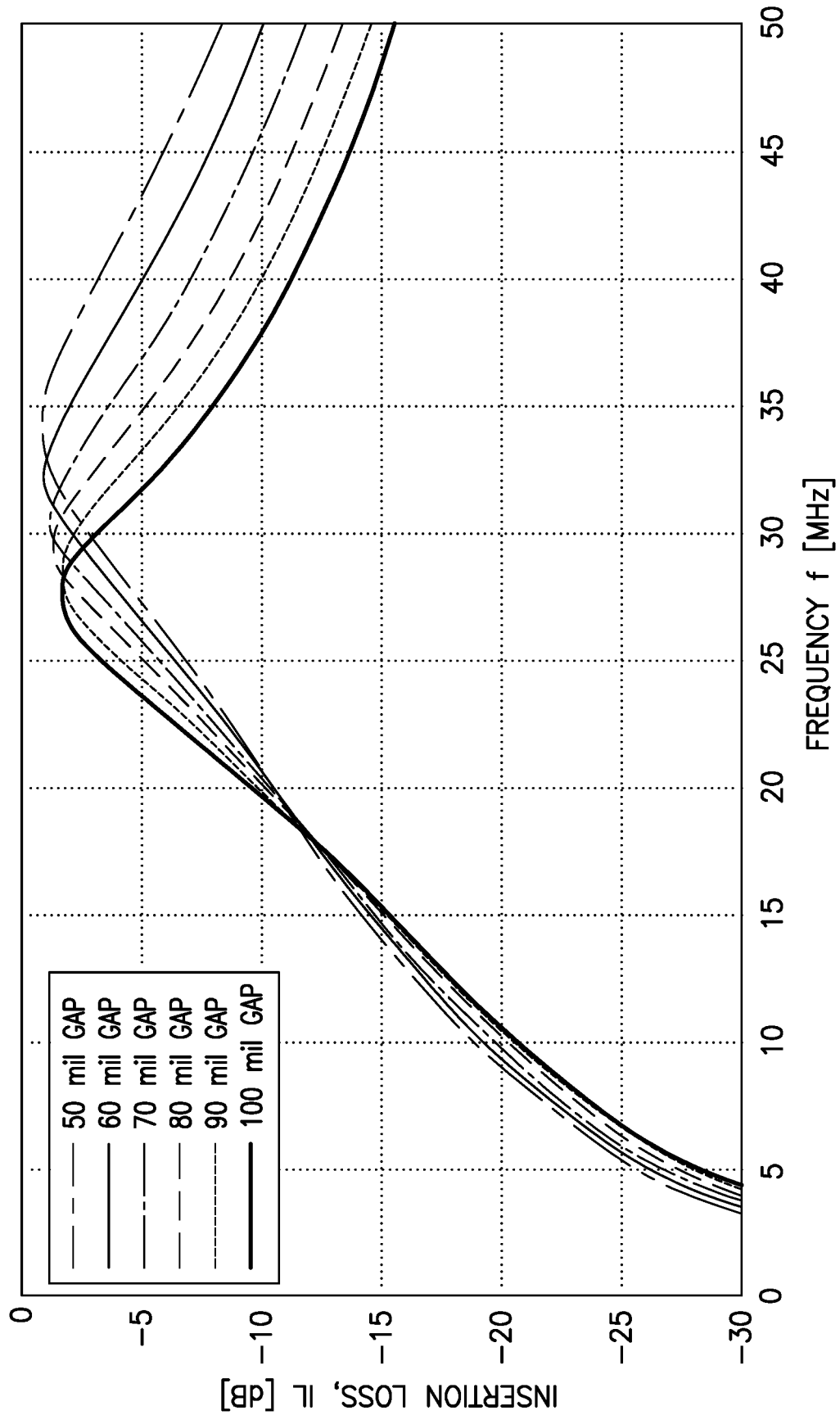
FIG. 4 is a graph showing predicted power transfer versus frequency (in MHz) for gaps of different sizes.

The resonant inductive coupling-based sensing method disclosed herein is based on having two inductors separated by some gap distance with the inductors having capacitors electrically connected as shown in FIG. 2. The electrical resonant frequency of each of inductor-capacitor sets L1/C1 and L2/C2 is tuned such that the resonant frequencies of both sets are equivalent. When a power signal is applied to one set near the resonant frequency, the other set will receive maximum power. The distance between the two inductors L1 and L2 determines the coupling efficiency of the inductors. FIG. 4 is a graph showing predicted power transfer (insertion loss in dB) versus frequency (in MHz) for gaps of different sizes spaced in a range of 50-100 mils.

Figure 5:
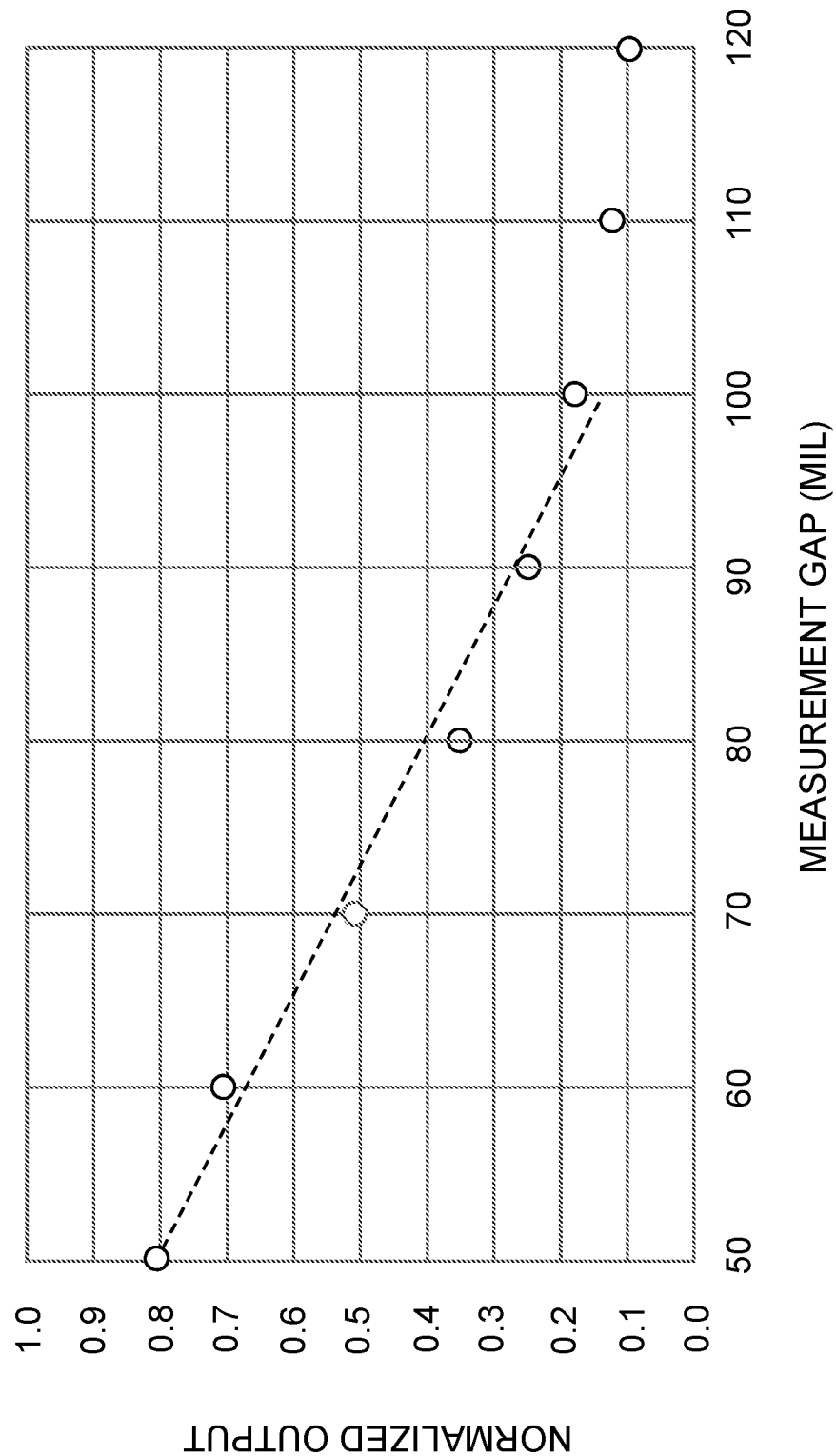
FIG. 5 is a graph showing predicted normalized output versus gap size (in mils) for a single frequency in accordance with one proposed implementation.

By observing the output voltage change a linear relationship can be determined within some range of distances. FIG. 5 is a graph showing predicted normalized output versus gap size (in mils) for a single frequency in accordance with one proposed implementation. For example, for two 4.9-µH inductors of dimensions ~18 mm×18 mm separated by a distance in the range from 50 to 100 mils, a linear relationship is observed for the output voltage. The measurement sensitivity of the example sensor is ~12.3 mV/V/mil.

Figure 6A:
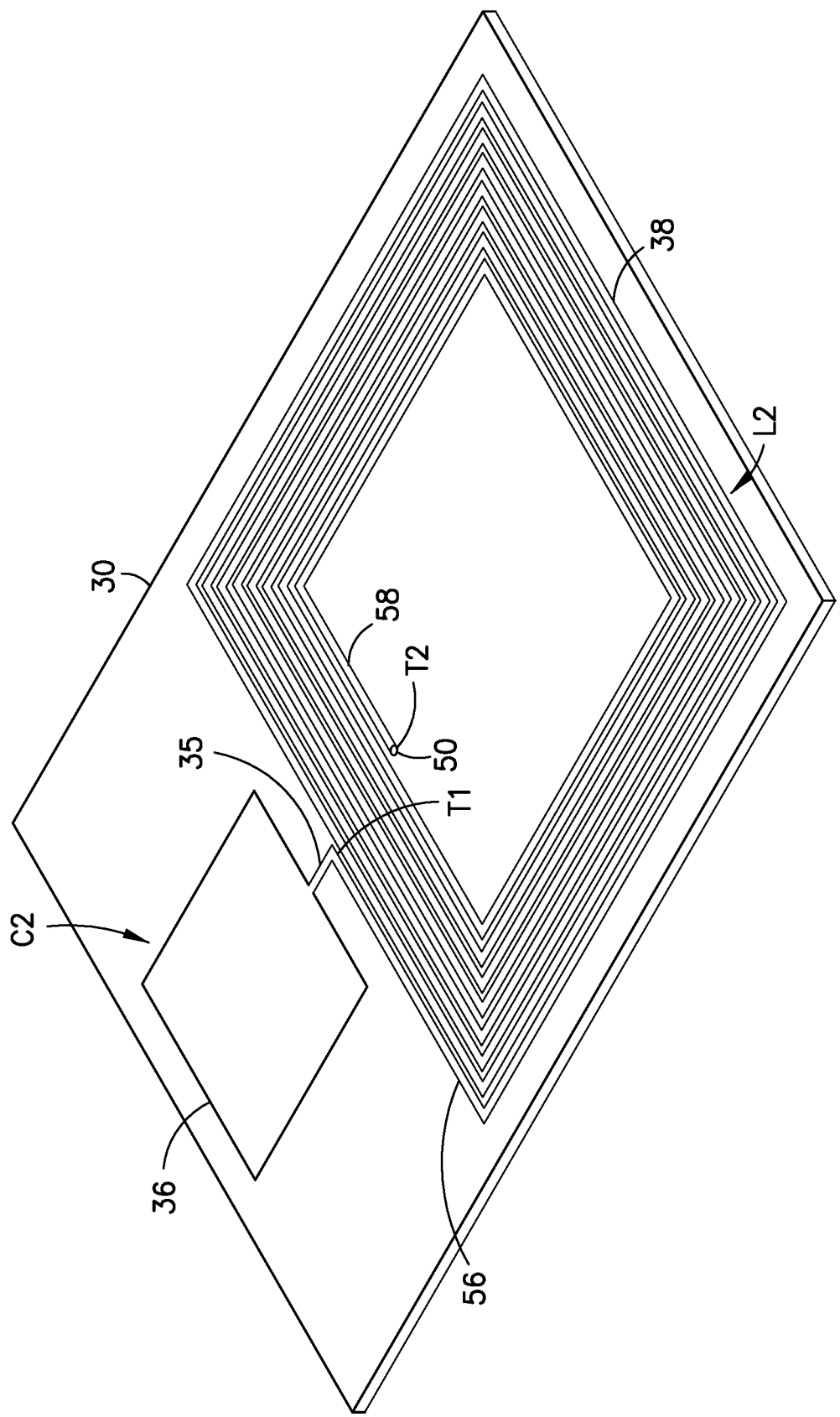

FIGS. 6A and 6B are diagrams showing respective three-dimensional views of an inductor-capacitor set patterned on respective flexible layers 30 and 32 of dielectric material (hereinafter "dielectric layers 30 and 32") for fabricating the flexible hybrid electronics in accordance with one embodiment. After the inductor-capacitor sets are formed on the dielectric layers 30 and 32 in the patterns depicted in FIGS. 6A and 6B, the dielectric layers 30 and 32 are laminated to each other to form a flexible substrate.

The inductor-capacitor set depicted in FIGS. 6A and 6B includes an inductor L2 and a capacitor C2 made of electrically conductive material (e.g., copper). In this example, the inductor L2 is an inductive coil 38 formed on the surface of the dielectric layer 30 (shown in FIG. 6A), while the capacitor C2 includes a top electrode 36 formed on the surface of the dielectric layer 30 30 (shown in FIG. 6A) and a bottom electrode 44 formed on the surface of the dielectric layer 32 (shown in FIG. 6B). In this example, the top and bottom electrodes 36 and 44 of the capacitor C2 are square and the loops of the inductive coil 38 are patterned as a winding made of rectilinear segments. In this example, the outer dimensions of the inductive coil 38 are 18 mm×18 mm and the outer dimensions of the top and bottom electrodes 36 and 44 are 6 mm×6 mm, while the dielectric layers 30 and 32 each have a thickness of 2 mils. In alternative implementations the loops may include circular arcs of increasing radius.

As seen in FIG. 6A, the top electrode 36 of the capacitor C2 is electrically connected to a terminus T1 of the outermost loop 56 of the inductive coil 38 by a conductor 35 that is formed on the surface of the dielectric layer 30. In addition, the innermost loop 58 of the inductive coil 38 also has a terminus T2 (shown in FIG. 6A) which is positioned adjacent to a via 50 formed in the dielectric layer 30.

The terminus T2 of the inductive coil 38 (shown in FIG. 6A) is electrically connected to the bottom electrode 44 formed on the dielectric layer 32 (shown in FIG. 6B) by conductors 52 and 46 which are connected in series. The conductor 46 (shown in FIG. 6B) is formed on the surface of the dielectric layer 32. The via 50 (shown in FIG. 6A) may be created by etching the dielectric layer 30. The via 50 is then filled a conductive epoxy (or electroplated) to form the vertically extending conductor 52 shown in FIG. 6B. In the final stackup, the conductor 52 extends vertically through the via 50 in dielectric layer 32 with its upper terminus connected to the terminus T2 of the inductor L2 and its lower terminus connected to the conductor 46. The conductors which electrically connect the top and bottom electrodes 36 and 44 of capacitor C2 to the junctions J2 and J3 (shown in FIG. 2) are not shown in FIGS. 6A and 6B.

Figure 7A:
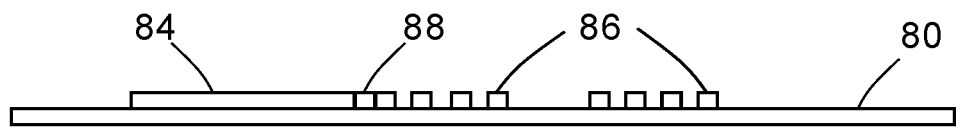
FIGS. 7A-7C are diagrams showing sectional views of various stages in a process for fabricating a single inductor-capacitor set of the flexible hybrid electronics in accordance with one embodiment.
Figure 7B:
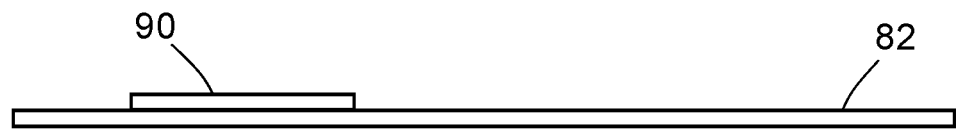
Figure 7C:
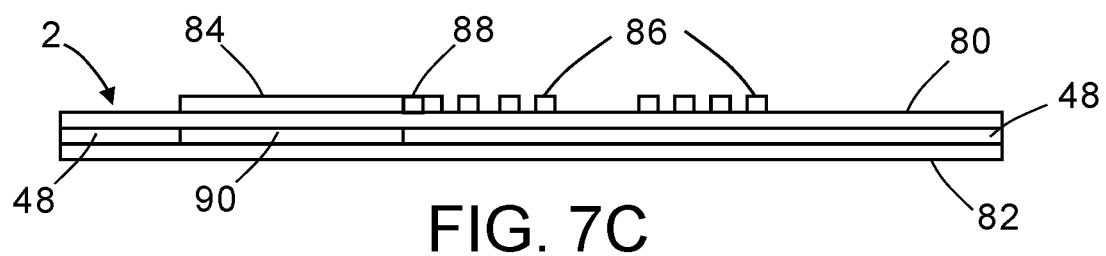

FIGS. 7A-7C are diagrams showing sectional views of various stages in a process for fabricating a single inductor-capacitor set of the first flexible hybrid electronics 2 (shown in FIG. 7C) in accordance with one embodiment. However, a person skilled in the art may appreciate that any number of inductor-capacitor sets may be formed on the flexible substrate of the first flexible hybrid electronics 2.

In the stage depicted in FIG. 7A, a top electrode 84, an inductive coil 86 and a conductor 88 connecting the top electrode 84 to the inductive coil 86 are formed on a dielectric layer 80 using either an additive or a subtractive method or a combination of additive and subtractive methods. One example of a subtractive method is to start with a substrate that consists of a layer of copper on a layer of polyimide. One such product is commercially available from DowDuPont Inc. under the brand name Pyralux®. The copper layer is selectively etched to remove copper, the remaining copper forming the pattern of circuitry partly depicted in FIG. 7A. In another step of the method depicted in FIG. 7B, a bottom electrode 90 is formed on a dielectric layer 82.

The shape and dimensions of the bottom electrode 90 may be the same as the shape and dimensions of the top electrode 84. The top electrode 84 on dielectric layer 80 and the bottom electrode 90 on dielectric layer 82 are positioned so that the electrodes are aligned to form a capacitor (e.g., capacitor C1 shown in FIG. 2) when the dielectric layers 80 and 82 are laminated to each other using adhesive film 48 as seen in FIG. 7C. The conductors which electrically connect the bottom electrode 90 and the inductive coil 86 to the signal generator 16 (shown in FIG. 2) are not shown in FIGS. 7A-7C.

FIGS. 8A-8F are diagrams showing sectional views of various stages in a process for fabricating a single inductor-capacitor set of the second flexible hybrid electronics 4 (shown in FIG. 8F) in accordance with one embodiment. However, a person skilled in the art may appreciate that any number of inductor-capacitor sets may be formed on the flexible substrate of the second flexible hybrid electronics 4.

Figure 8A:
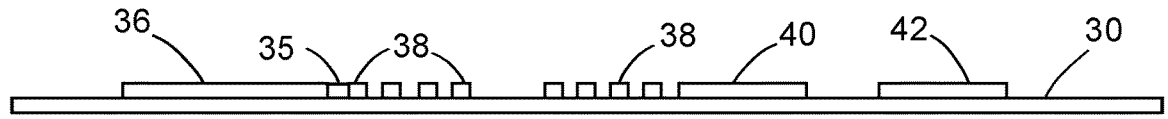
FIGS. 8A-8F are diagrams showing sectional views of various stages in a process for fabricating a single inductor-capacitor set of the flexible hybrid electronics in accordance with one embodiment.
Figure 8B:

In the stage depicted in FIG. 8A, a top electrode 36, an inductive coil 38 and a conductor 35 connecting the top electrode 36 to the inductive coil 38 are formed on a dielectric layer 30 using either an additive or a subtractive method or a combination of additive and subtractive methods. A pair of conductive pads 40 and 42 are also formed on the dielectric layer 30. Optionally, the transmit antenna 22 may also be formed on the dielectric layer 30. In another step of the method depicted in FIG. 8B, a bottom electrode 44 and a conductor 46 are formed on a dielectric layer 32. A terminus of the conductor 46 is connected to the bottom electrode 44.

Figure 8C:
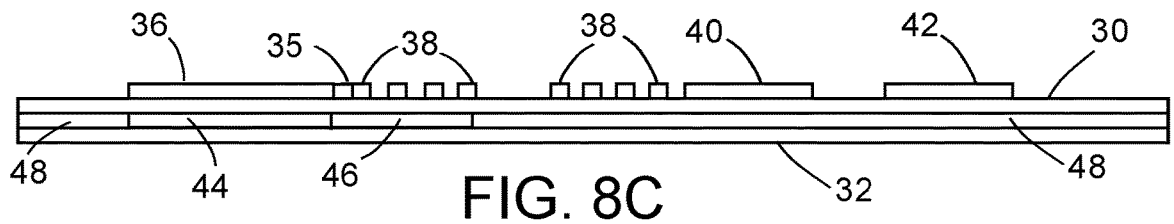

The shape and dimensions of the bottom electrode 44 may be the same as the shape and dimensions of the top electrode 36. The top electrode 36 on dielectric layer 30 and the bottom electrode 44 on dielectric layer 32 are positioned so that the electrodes are aligned to form a capacitor (e.g., capacitor C2 shown in FIG. 2) when the dielectric layers 30 and 32 are laminated to each other using adhesive film 48 as seen in FIG. 8C.

Figure 8D:
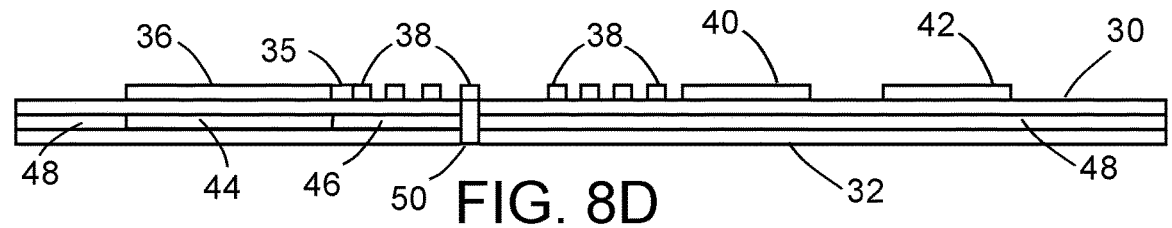

In accordance with the embodiment depicted in FIG. 8D, a via 50 is etched in the lamination to form a through via instead of a blind via (as depicted in FIG. 6A). A through via may be used for ease of fabrication if the surface of the structure to which the second flexible hybrid electronics 4 is adhered does not consist of electrically conductive material.

Figure 8E:
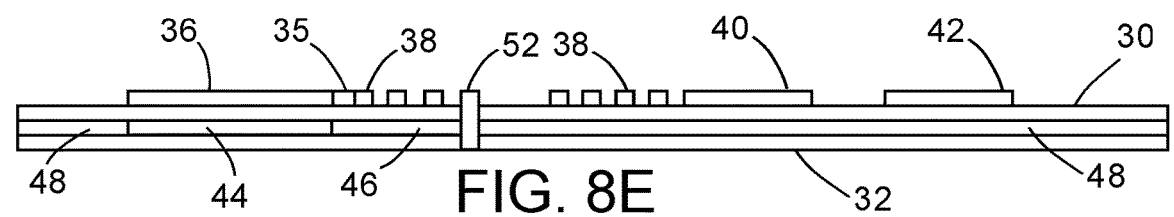
Figure 8F:
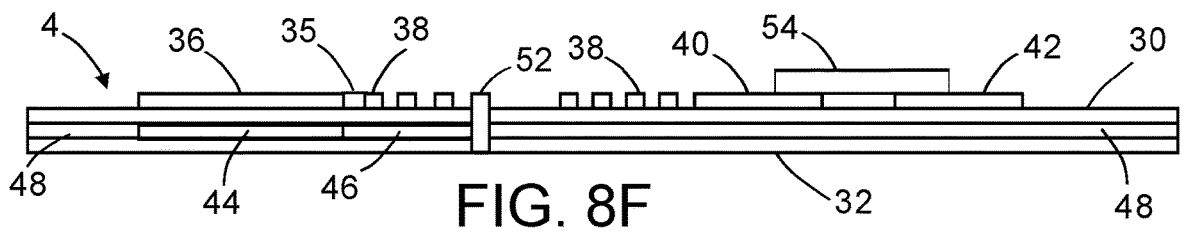

In the next stage of the process, the via 50 is filled with a conductive epoxy to form a conductor 52 that extends vertically through the dielectric layers 30 and 32, as shown in FIG. 8E. A projecting portion of the conductor 52 is connected to the terminus T2 (shown in FIG. 6A) of the innermost loop 58 of the inductive coil 38. In the alternative, the via 50 may be electroplated to form the conductor 52. Thereafter packaged electronics 54 (e.g., including the half-wave rectifier D1 and the signal processor 20 shown in FIG. 2) are optionally attached to produce the final assembly.

Figure 9A:
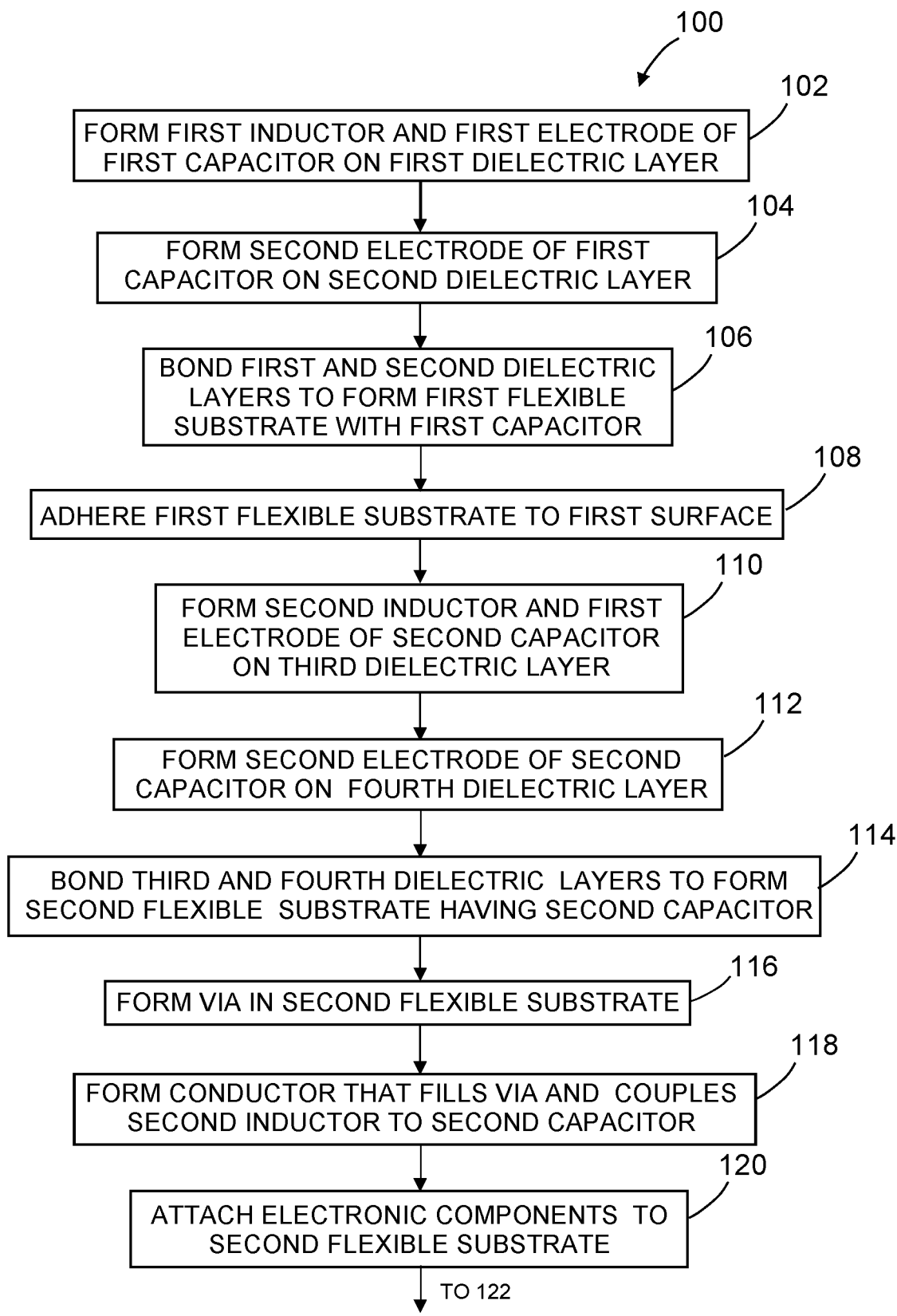
FIGS. 9A and 9B are flowcharts identifying steps of a method for fabricating and a method of installing a system for measuring an air gap between opposing surfaces of two structural members in accordance with one embodiment.
Figure 9B:
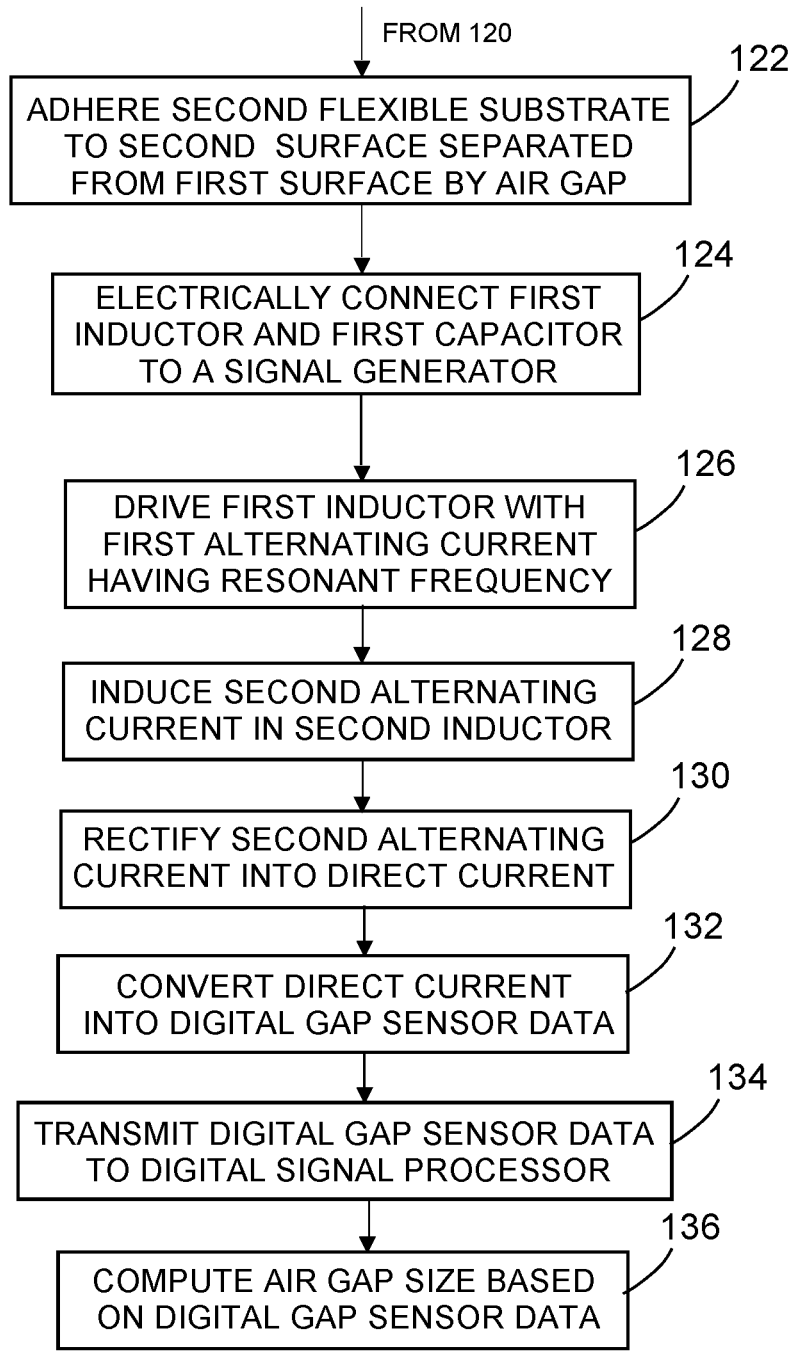

FIGS. 9A and 9B are flowcharts identifying steps of a method 100 for fabricating and then installing a system for measuring an air gap between opposing surfaces of two structural members in accordance with one embodiment.

Referring to FIG. 9A, the method 100 begins by forming a first inductor and a first electrode of a first capacitor on a first dielectric layer (step 102). The first inductor is electrically connected to the first electrode of the first capacitor. In addition, a second electrode of the first capacitor is formed on a second dielectric layer (step 104). (Although the flowchart shows step 102 preceding step 104, step 104 may be performed before, after or during step 102.) The first and second dielectric layers are then bonded together to form a first flexible substrate with the first capacitor (step 106). The first flexible substrate is later adhered to a first surface of a first part that will be ultimately mated with a second part (step 108). The parts may be structural components of an aircraft. Before, after or during the performance of any one of steps 102, 104, 106 and 108, a second inductor and a first electrode of a second capacitor are formed on a third dielectric layer (step 110). The second inductor is electrically connected to the first electrode of the second capacitor. In addition, a second electrode of the second capacitor is formed on a fourth dielectric layer (step 112). (Although the flowchart shows step 112 preceding step 110, step 112 may be performed before, after or during step 110.) The third and fourth dielectric layers are then bonded together to form a second flexible substrate with the second capacitor (step 114). A via is formed in the second flexible substrate (step 116). In accordance with the proposed implementation depicted in FIG. 9A, a conductor is formed that fills the via and electrically connects the second inductor to the second electrode of the second capacitor (step 118). Then electrical components (such as a half-wave rectifier and a signal processor) are attached to the second flexible substrate (step 120).

Referring to FIG. 9B, the method 100 continues by adhering the second flexible substrate to a second surface of a second part separated from the first part by an air gap such that the first and second inductors are mutually aligned (step 122). At any time subsequent to step 106, the first inductor and the first capacitor are electrically connected to a signal generator (step 124). Following completion of all of the steps identified in FIG. 9A and steps 122 and 124 identified in FIG. 9B, the gap measurement process may begin. The first inductor is driven with a first alternating current to produce a changing magnetic flux that passes through the second inductor (step 126). The first alternating current has a frequency equal to a resonant frequency of the LC circuit formed by the second inductor and second capacitor. A second alternating current is induced in the second inductor due to the magnetic flux passing through the second inductor (step 128). The second alternating current is the rectified into a direct current (step 130). That direct current is converted into digital gap sensor measurement data that varies in dependence on the distance separating the first and second inductors (step 132). Then the digital gap sensor measurement data is transmitted wirelessly to a digital signal processor (step 134). The digital signal processor computes an air gap size based on the digital gap sensor measurement data (step 136). This process may be repeated at multiple positions on the opposing surfaces of the two parts to compute an air gap profile, which air gap profile may be used to fabricate a shim that fills the air gap between the two parts.

Figure 10:
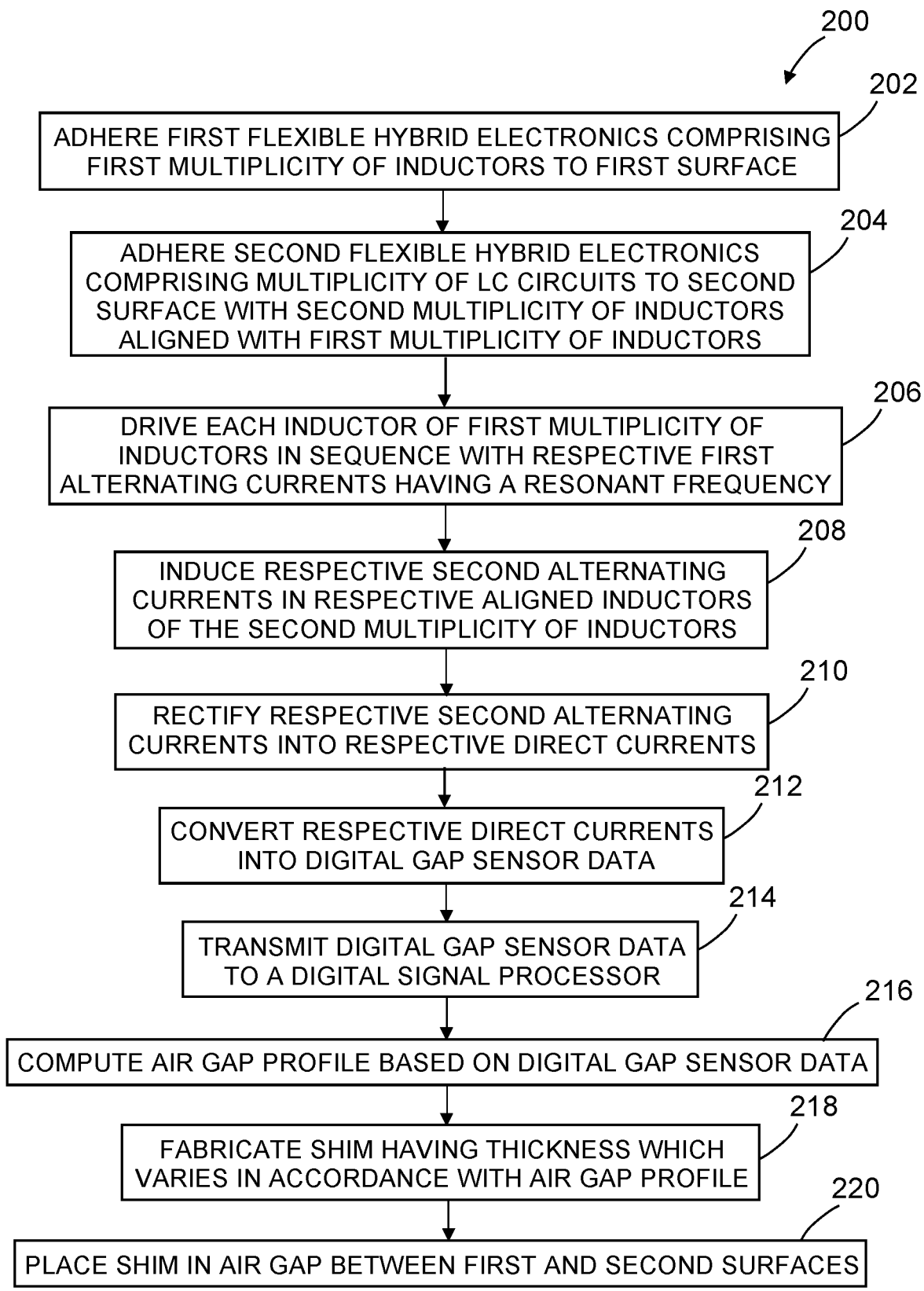
FIG. 10 is a flowchart identifying steps of a method for determining an air gap profile between two surfaces and then fabricating a shim using the air gap profile in accordance with one embodiment.

FIG. 10 is a flowchart identifying steps of a method 200 for determining an air gap profile between two surfaces and then fabricating a shim using the air gap profile in accordance with one embodiment. During the set-up process, the first flexible hybrid electronics comprising a first multiplicity of LC circuits are adhered to a first surface of a first part (step 202) and the second flexible hybrid electronics comprising a second multiplicity of LC circuits are adhered to a second surface of a second part (step 204). Each LC circuit of the first multiplicity of LC circuits comprises a respective inductor of a first multiplicity of inductors; each LC circuit of the second multiplicity of LC circuits comprises a respective inductor of a second multiplicity of inductors. The second multiplicity of inductors are respectively aligned with the first multiplicity of inductors when the flexible hybrid electronics are correctly positioned relative to each other. When the system is ready to begin a measurement procedure, the inductors of the first multiplicity of inductors are driven in sequence with respective first alternating currents to produce a changing magnetic flux that passes through respective aligned inductors of the second multiplicity of inductors (step 206). The first alternating currents have a frequency equal to a resonant frequency of the LC circuits. In response to sequential activation of the inductors of the first multiplicity of inductors, respective second alternating currents are induced in the respective aligned inductors of the second multiplicity of inductors due to the magnetic flux passing through the respective aligned inductors of the second multiplicity of inductors (step 208) The respective second alternating currents are rectified into respective direct currents (step 210). Then the respective direct currents are converted into digital gap sensor measurement data that varies in dependence on the respective distances separating respective aligned inductors of the first and second multiplicities of inductors (step 212). The digital gap sensor measurement data is transmitted to a digital signal processor (step 214). The digital signal processor computes an air gap profile based on the digital gap sensor measurement data (step 216). Then a shim having a thickness which varies in accordance with the air gap profile is fabricated (step 218). The shim is then placed in the air gap between the first and second parts (step 220).

In accordance with the methodology described above, the air gap profile between two mated structural components is determined and then used to fabricate a shim. In accordance with an alternative methodology, a first air gap profile between one of the structural components and a planar reference is measured and then a second air gap profile between the other structural components and a planar reference is measured. The results of these two measurements are then merged to develop the final shim thickness profile. The final shim thickness profile data is sent to the machine tool which manufactures the shim. The manufactured shim is then installed, and final "pull-up" tolerances are checked before the mating components are finally fastened together. This scenario allows shims to be measured and manufactured before final integration.

While systems and methods for measuring an air gap between first and second surfaces have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline or wireless connections. Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The above examples are exemplary only, and thus are not intended to limit in any way the definition and/or meaning of the term "computer system".

As used herein, first and second elements are "electrically connected", even when no electric power is being provided to either element, if when electric power is received by the first element, the electric power received by the second element would vary in response to changes in the electric power received by the first element. In other words, it should be understood that two elements may be "electrically connected" even though the system is turned off.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A system for measuring an air gap between first and second surfaces, comprising:
   a first flexible substrate adhered to the first surface;
   a first LC circuit supported by the first flexible substrate and comprising a first inductor and a first capacitor;
   a signal generator electrically connected to the first LC circuit;
   a second flexible substrate adhered to the second surface;
   a second LC circuit supported by the second flexible substrate and comprising a second inductor and a second capacitor;
   a signal processor electrically connected to the second LC circuit; and
   a transmit antenna electrically connected to the signal processor, wherein the first inductor is aligned with the second inductor.

2. The system as recited in claim 1, further comprising a half-wave rectifier that converts alternating current from the second LC circuit into direct current that is received by the signal processor.

3. The system as recited in claim 2, wherein the signal processor is configured to convert analog signals from the half-wave rectifier into digital signals.

4. The system as recited in claim 2, wherein the signal processor and half-wave rectifier are surface mounted on the second flexible substrate.

5. The system as recited in claim 4, wherein the transmit antenna is disposed on the second flexible substrate.

6. The system as recited in claim 1, wherein the signal processor is configured to receive electric power from the transmit antenna.

7. The system as recited in claim 1, wherein the first flexible substrate comprises first and second dielectric layers adhered to each other, the first inductor is disposed on the first dielectric layer, the first capacitor comprises one electrode disposed on the first dielectric layer and electrically connected to the first inductor and another electrode disposed between the first and second dielectric layers.

8. The system as recited in claim 7, wherein the second flexible substrate comprises third and fourth dielectric layers adhered to each other, the second inductor is disposed on the third dielectric layer, the second capacitor comprises one electrode disposed on the third dielectric layer and electrically connected to the second inductor and another electrode disposed between the third and fourth dielectric layers and electrically connected to the second conductor.

9. The system as recited in claim 1, further comprising a receive antenna, a digital signal processor configured to output digital gap size data which represents an air gap profile and is a function of digital gap sensor measurement data received by the receive antenna, a non-transitory tangible computer-readable storage medium for storing the gap size data output by the digital signal processor, and a display device for displaying symbology representing the air gap profile in response to retrieval of the gap size data from the non-transitory tangible computer-readable storage medium.

10. The system as recited in claim 1, further comprising a third LC circuit supported by the first flexible substrate and electrically connected to the signal generator, and a fourth LC circuit supported by the second flexible substrate and electrically connected to the signal processor, the third LC circuit comprising a third inductor and a third capacitor, the fourth LC circuit comprising a fourth inductor and a fourth capacitor, and the third inductor being aligned with the fourth inductor.

11. A method for measuring an air gap between a first surface of a first part and a second surface of a second part, comprising:
adhering first flexible hybrid electronics comprising a first LC circuit formed on a first flexible substrate to the first surface of the first part;
adhering second flexible hybrid electronics comprising a second LC circuit formed on a second flexible substrate to the second surface of the second part;
driving a first inductor of the first LC circuit with a first alternating current to produce a changing magnetic flux that passes through a second inductor of the second LC circuit, which first alternating current has a frequency equal to a resonant frequency of the second LC circuit;
inducing a second alternating current in the second inductor due to the magnetic flux passing through the second inductor;
rectifying the second alternating current into a first direct current;
converting the first direct current into first digital gap sensor measurement data that varies in dependence on a first distance separating the first and second inductors;
transmitting the first digital gap sensor measurement data to a digital signal processor; and
computing a first air gap size based on the first digital gap sensor measurement data, wherein the computing is performed by the digital signal processor.

12. The method as recited in claim 11, wherein the first flexible hybrid electronics further comprises a third LC circuit and the second flexible hybrid electronics further comprises a fourth LC circuit, the method further comprising:
driving a third inductor of the third LC circuit with a third alternating current to produce a changing magnetic flux that passes through a fourth inductor of the fourth LC circuit, which third alternating current has a frequency equal to a resonant frequency of the fourth LC circuit;
inducing a fourth alternating current in the fourth inductor due to the magnetic flux passing through the fourth inductor;
rectifying the fourth alternating current into a second direct current;
converting the second direct current into second digital gap sensor measurement data that varies in dependence on a second distance separating the third and fourth second inductors;
transmitting the second digital gap sensor measurement data to the digital signal processor; and
computing a second air gap size based on the second digital gap sensor measurement data.

13. The method as recited in claim 12, wherein the first and second parts are structural components of an aircraft, further comprising:
fabricating a shim having a thickness which varies in accordance with an air gap profile that includes the first and second air gap sizes; and
placing the shim in the air gap between the between the first and second parts.

14. The method as recited in claim 11, wherein the first part is a structural component of an aircraft and the second part is a planar reference.

15. The method as recited in claim 11, wherein converting the first direct current into first digital gap sensor measurement data is performed by a signal processor and transmitting the first digital gap sensor measurement data is performed by a transmit antenna, the method further comprising wirelessly transferring electric power to the signal processor via the transmit antenna.

16. A method for determining an air gap profile between a first surface of a first part and a second surface of a second part, comprising:
adhering first first flexible hybrid electronics comprising a first multiplicity of inductors formed on a first flexible substrate to the first surface of the first part;
adhering second flexible hybrid electronics comprising a second multiplicity of inductors formed on a second flexible substrate to the second surface of the second part, the inductors of the second multiplicity of inductors being respectively aligned with the inductors of the first multiplicity of inductors;
driving the inductors of the first multiplicity of inductors in sequence with respective first alternating currents to produce a changing magnetic flux that passes through respective aligned inductors of the second multiplicity of inductors;

inducing respective second alternating currents in the respective aligned inductors of the second multiplicity of inductors due to the magnetic flux passing through the respective aligned inductors of the second multiplicity of inductors;

rectifying the respective second alternating currents into respective direct currents;

converting the respective direct currents into digital gap sensor measurement data that varies in dependence on the respective distances separating respective aligned inductors of the first and second multiplicities of inductors;

transmitting the digital gap sensor measurement data to a digital signal processor; and computing an air gap profile based on the digital gap sensor measurement data, wherein the computing is performed by the digital signal processor.

17. The method as recited in claim 16, further comprising:
fabricating a shim having a thickness which varies in accordance with the air gap profile; and
placing the shim in the air gap between the first and second parts.

18. A method for fabricating a gap sensor, comprising:
forming a first inductor and a first electrode of a first capacitor on a first dielectric layer, wherein the first inductor is electrically connected to the first electrode of the first capacitor;
forming a second electrode of the first capacitor on a second dielectric layer;
bonding the first dielectric layer to the second dielectric layer to form a first flexible substrate with the first capacitor;
forming a second inductor and a first electrode of a second capacitor on a third dielectric layer, wherein the second inductor is electrically connected to the first electrode of the second capacitor;
forming a second electrode of the second capacitor on a fourth dielectric layer;
bonding the third dielectric layer to the fourth dielectric layer to form a second flexible substrate with the second capacitor;
forming a via in the second flexible substrate; and
forming a conductor that fills the via and electrically connects the second inductor to the second electrode of the second capacitor.

19. The method as recited in claim 18, further comprising:
electrically coupling the first inductor and the first capacitor to a signal generator.

20. The method as recited in claim 19, further comprising:
adhering the first flexible substrate to a first surface of a first part; and
adhering the second flexible substrate to a second surface of a second part separated from the first surface of the first part by an air gap,
wherein when the first and second flexible substrates are respectively adhered to the first and second surfaces, the first and second inductors are mutually aligned.

21. The method as recited in claim 18, further comprising:
attaching electronic components to the second flexible substrate; and
electrically coupling the second inductor and the second capacitor to the attached electrical components.

* * * * *